United States Patent [19]

Yamaoka et al.

[11] Patent Number: 5,158,161
[45] Date of Patent: Oct. 27, 1992

[54] REVERSE INSTALLATION TYPE VARIABLE DAMPING FORCE SHOCK ABSORBER VARIABLE OF DAMPING CHARACTERISTICS BOTH FOR BOUNDING AND REBOUNDING STROKE MOTIONS

[75] Inventors: Fumiyuki Yamaoka; Shinobu Kakizaki; Mitsuo Sasaki; Hiroyuki Shimizu; Junichi Emura, all of Kanagawa, Japan

[73] Assignee: Atsugi Unisia Corporation, Japan

[21] Appl. No.: 552,539

[22] Filed: Jul. 16, 1990

[30] Foreign Application Priority Data

| Jul. 17, 1989 | [JP] | Japan | 1-183910 |
| Jul. 17, 1989 | [JP] | Japan | 1-183911 |
| Jul. 17, 1989 | [JP] | Japan | 1-183912 |
| Jul. 27, 1989 | [JP] | Japan | 1-194472 |
| Aug. 1, 1989 | [JP] | Japan | 1-199823 |

[51] Int. Cl.$^5$ ............................................. F16F 5/00
[52] U.S. Cl. .................................. 188/299; 188/315; 188/322.14
[58] Field of Search ............ 188/322.15, 322.14, 188/315, 314, 299, 285; 267/64.26, 64.13; 280/714, 707, 708

[56] References Cited

U.S. PATENT DOCUMENTS

| 4,624,347 | 11/1986 | Mourray | 188/322.15 |
| 4,706,787 | 11/1987 | Wössner | 188/299 |
| 4,749,068 | 6/1988 | Sirven | 188/322.15 |
| 4,821,851 | 4/1989 | Kruckemeier et al. | 188/299 |
| 4,832,162 | 5/1989 | Bacardit | 188/322.14 |
| 4,923,038 | 5/1990 | Lizell | 188/322.15 |

FOREIGN PATENT DOCUMENTS

| 0304599 | 3/1989 | European Pat. Off. | 188/322.15 |
| 1524867 | 9/1978 | United Kingdom | 188/322.15 |

Primary Examiner—Robert J. Oberleitner
Assistant Examiner—Chris Schwartz
Attorney, Agent, or Firm—Ronald P. Kananen

[57] ABSTRACT

A shock absorber has a cylinder tube coaxially arranged with a strut tube for defining therebetween an annular reservoir chamber and an upper reservoir chamber which is separated from the annular reservoir chamber. A first fluid path is defined for permitting fluid flow from a lower fluid chamber in the cylinder tube to an upper fluid chamber and the annular reservoir chamber in response to bounding stroke of vibration. A second fluid path is also defined for permitting fluid flow from the lower fluid chamber to the upper fluid chamber and the annular reservoir chamber, in response to rebounding stroke of vibration. A first flow restriction means is disposed in the first path for generating damping force in response to bounding stroke of vibration, which damping force is variable depending upon the magnitude of the bounding stroke in essentially linear variation characteristics. A second flow restriction means is also disposed in the second path for generating damping force in response to bounding stroke of vibration, which damping force is variable depending upon the magnitude of the bounding stroke in essentially linear variation characteristics.

12 Claims, 15 Drawing Sheets

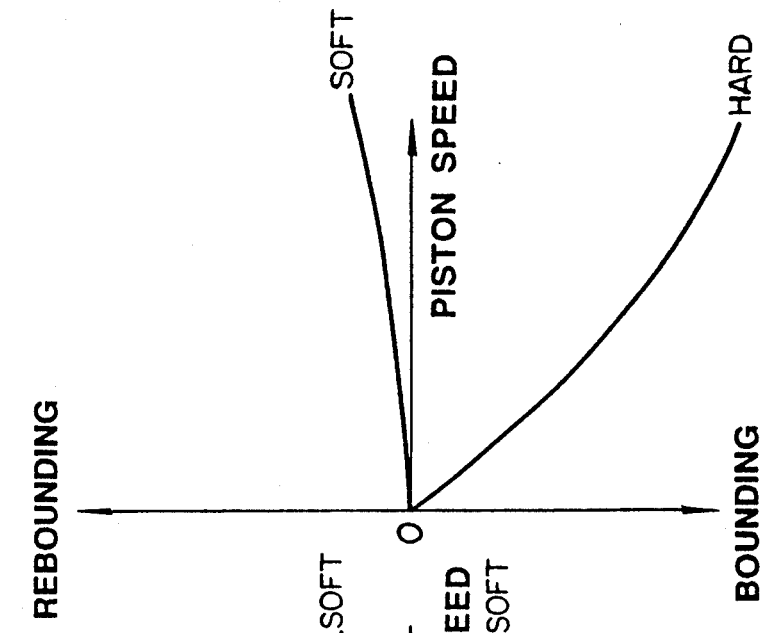

REVERSE INSTALLATION TYPE VARIABLE DAMPING FORCE SHOCK ABSORBER VARIABLE OF DAMPING CHARACTERISTICS BOTH FOR BOUNDING AND REBOUNDING STROKE MOTIONS

BACKGROUND OF THE INVENTION

1. Field of the Invention

The present invention relates generally to a variable damping force shock absorber for an automotive vehicle. More specifically, the invention relates to a reverse installation type shock absorber designed to be connected to a suspension member, such as suspension arm, suspension link or so forth, at the lower end of a piston rod and for variation of damping characteristics depending upon piston stroke.

2. Description of the Background Art

Such reverse installation type shock absorber has been disclosed in Japanese Patent First (unexamined) Publication No. 58-97334, for example. The shown shock absorber is designed for installation between a vehicular body and a suspension member which rotatably supports a vehicular wheel, in reversed manner to the usual shock absorber. The shock absorber includes a cylinder tube, a piston thrustingly or slidingly disposed within the internal space of the cylinder tube, and a strut tube thrustingly and slidingly supporting the cylinder tube. The top end of the cylinder tube is connected to a vehicular body. On the other hand, a piston rod extends downwardly from the bottom of cylinder tube for connection with the suspension member.

Such prior proposed reverse installation type shock absorber is defective in some aspects. For instance, the prior proposed shock absorber is so designed as to permit fluid flow from an upper fluid chamber to a lower fluid chamber via a predetermined bounding stroke fluid path and from the upper fluid chamber to an annular reservoir chamber defined between the cylinder tube and the strut tube. For this structure, the flow restriction magnitude for the fluid from the upper fluid chamber and to the lower fluid chamber cannot be great enough to provide satisfactorily high damping characteristics due possibly to cavitation. As a result, variation range of the damping characteristics is strictly limited. The cylinder tube and the strut tube may be subject of forces transverse to the axis thereof. For this reason, the cylinder tube may be required to have not only a high precision level in production for assuring smooth motion of the piston but also sufficiently high strength for resisting against the transverse forces. This could clearly cause high costs in production.

SUMMARY OF THE INVENTION

Therefore, it is an object of the present invention to provide a reverse installation type shock absorber which can solve the drawbacks in the prior art as set forth above.

Another object of the present invention is to provide a reverse installation type shock absorber which has variable damping characteristics both for bounding and rebounding motion.

In order to accomplish aforementioned and other objects, a shock absorber, in accordance with the present invention, has a cylinder tube coaxially arranged with a strut tube for defining therebetween an annular reservoir chamber and an upper reservoir chamber which is separated from the annular reservoir chamber. A first fluid path is defined for permitting fluid flow from an upper fluid chamber in the cylinder tube to a lower fluid chamber to the annular reservoir chamber and upper reservoir chamber in response to the bounding stroke of vibration. A second fluid path is also defined for permitting fluid flow from the lower fluid chamber and the upper reservoir chamber to the upper fluid chamber and the upper annular chamber, in response to rebounding stroke of vibration. A first flow restriction means is disposed in the first path for generating damping force in response to the bounding stroke of vibration, which damping force is variable depending upon the magnitude of bounding stroke in essentially linear variation characteristics. A second flow restriction means is also disposed in the second path for generating damping force in response to the bounding stroke of vibration, which damping force is variable depending upon the magnitude of the bounding stroke in essentially linear variation characteristics.

According to one aspect of the invention, a reverse installed type variable damping force shock absorber for an automotive suspension system, comprises:

an inner cylinder filled with a working fluid;

an outer cylinder coaxially housing therein the inner cylinder and connected to a vehicular body for vertical movement according to vertical motion of the vehicular body, the outer cylinder defining a space between the inner cylinder, the space forming a reservoir chamber and a communication chamber which is separated from the reservoir chamber;

a piston disposed within the interior space of the inner cylinder for defining therein first and second fluid chambers; the piston being connected to a suspension member rotatably supporting a vehicular wheel via a piston rod for vertical movement with the vehicular wheel;

a first fluid path means for establishing fluid communication between the first fluid chamber and the second fluid chamber via the communication chamber;

a second fluid path means for establishing fluid communication between the second fluid chamber and the reservoir chamber via the communication chamber;

a first damping force generating means disposed in the first path for generating damping force against bounding mode relative displacement between the vehicular body and the vehicular wheel; and a second damping force generating means disposed in the second fluid path means for generating damping force against rebounding mode relative displacement between the vehicular body and the vehicular wheel.

Preferably, the shock absorber may further comprise a third fluid path means for establishing fluid communication between the first fluid chamber and the reservoir chamber by passing the first and second fluid path means, a first variable throttling means disposed in the third fluid path means and externally operable for adjusting flow restriction magnitude. Also, the shock absorber may further comprise a fourth fluid path means for establishing fluid communication between the first and second fluid chambers, and a second variable throttling means disposed in the fourth fluid path means and externally operable for adjusting flow restriction magnitude.

The first and second flow restriction means may be operative for providing different damping characteristics for bounding and rebounding mode relative motions of the vehicular body and the piston assembly 50.

Each of the first and second flow restriction means may be switchable between a harder damping mode and softer damping mode so that harder damping characteristics are obtained for the bounding mode relative motion when damping characteristics for the rebounding mode motion are set in softer characteristics and vice versa. The flow restriction means are so cooperated as to further establish softer damping characteristics both for bounding and rebounding mode relative motions of the vehicular body and the vehicular wheel.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiment or embodiments, but are for explanation and understanding only.

In the drawings:

FIGS. 19, 20 and 21 are charts showing damping characteristics relative to the bounding and rebounding motions at various modes in the shock absorber employing the top valve of FIG. 9;

DESCRIPTION OF THE PREFERRED EMBODIMENT

Figure 1:
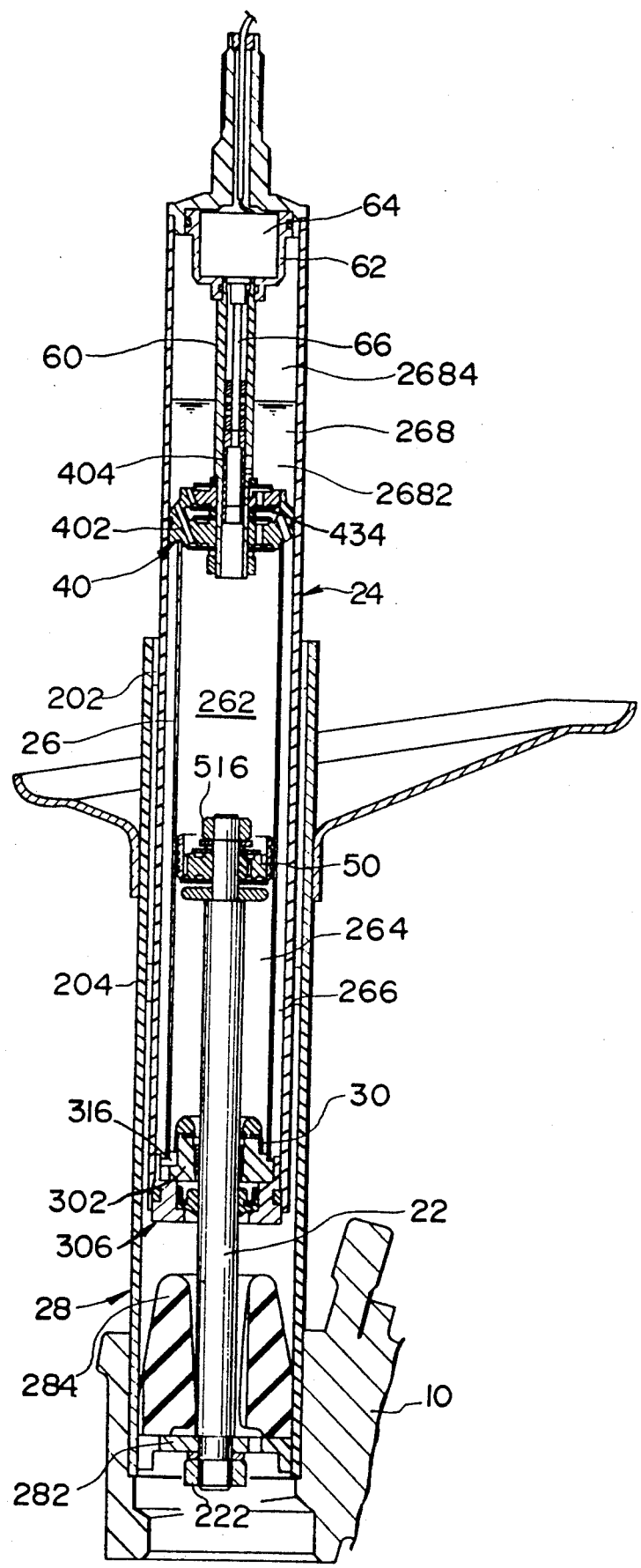
FIG. 1 is a section of the preferred embodiment of a reverse installation type shock absorber according to the invention, which section is used for discussion of overview of the shock absorber according to the invention.

Referring now to the drawings, particularly to FIG. 1, the preferred embodiment of a shock absorber, according to the present invention, is designed for reverse installation by connecting the lower end of a piston rod 22 to a knuckle spindle 10 and the top end of an outer tube 24 to a vehicular body (not shown). The shock absorber includes a cylinder tube 26 which is generally formed in an upper and lower open-ended cylindrical configuration. A bottom fitting guide assembly 30 is fitted onto the bottom end opening of the cylinder tube 26. On the other hand, a top valve assembly 40 is fitted onto the top end opening of the cylinder tube 26. The cylinder tube 26 thus formed is filled with a working fluid and is coaxially disposed in the interior space of the outer tube 24. On the other hand, the outer tube 24 is coaxially arranged with a strut tube 28.

A piston assembly 50 is thrustingly and slidingly disposed within the interior space of the cylinder tube 26 for separating it into an upper fluid chamber 262 and a lower fluid chamber 264. The piston assembly 50 is rigidly fitted onto the upper end of the piston rod 22 for movement therewith according to movement of the knuckle spindle 10 relative to the vehicular body. The piston rod 22 extends downwardly through the bottom fitting guide assembly 30 and connected to the knuckle spindle. On the other hand, the top valve assembly 40 is connected to the lower end of a cylindrical support 60 which is, in turn, rigidly connected to an actuator casing 62. With the shown construction, the cylinder tube 26 with the top valve assembly 40 and the bottom fitting guide assembly 30 are movable with the outer tube 24 according to vertical movement of the vehicular body relative to the knuckle spindle 10. In order to assist thrusting movement of the outer tube 24 relative to the strut tube 28 which is fixed to the knuckle spindle 10, upper and lower plane bearings 202 and 204 are provided between the inner periphery of the strut tube 28 and the outer tube 24.

As can be seen from FIG. 1, the top valve assembly 40 and the bottom fitting guide assembly 30 have seal rings 402 and 302 which establish sealing contact with the inner periphery of the outer tube 24 for defining therein enclosed spaces. An annular lower reservoir chamber 266 is defined between the cylinder tube 26 and the outer cylinder 24. Both axial ends of the lower fluid reservoir chamber 266 are sealingly closed by the seal rings 402 and 302. On the other hand, an upper fluid reservoir chamber 268 is defined above the upper end of the cylinder tube 26. The upper fluid reservoir chamber 268 is separated from the lower fluid reservoir chamber 266 by the upper seal ring 402. As can be seen, the upper fluid reservoir chamber 268 defines non-separated liquidous fluid chamber 2682 and gaseous fluid chamber 2684 which encloses a pressure medium gas, such as air. Since the pressure medium gas in the gaseous fluid chamber 2684 is enclosed therein, the upper fluid reservoir chamber 268 may have pressure accumulating capacity.

As will be discussed later, the lower fluid reservoir chamber 266 is in fluid communication with the lower fluid chamber 264 via a fluid path defined through the bottom fitting guide assembly 30. Similarly, the upper fluid reservoir chamber 268 is in fluid communication with the upper fluid chamber 262 via a fluid path defined through the top valve assembly 40. The fluid path in the top valve assembly 40 is variable of flow restriction magnitude for the fluid flow therethrough by means of a rotary valve 404 which is drivingly connected to an electrically operable actuator 64 housed within the actuator housing 62 via an actuator rod 66 extending through the cylindrical support 60. On the other hand, the upper and lower fluid chambers 262 and 264 are in fluid communication with each other via a fluid path defined through the piston assembly 50.

As seen from FIG. 1, the strut tube 28 is fixed to the knuckle spindle 10. An end fitting 282 with a rubber bumper 284 is secured onto the bottom end of the strut tube 28. The lower end of the piston rod 22 is rigidly connected to the end fitting 282 by means of a fastening nut 222.

Figure 2:
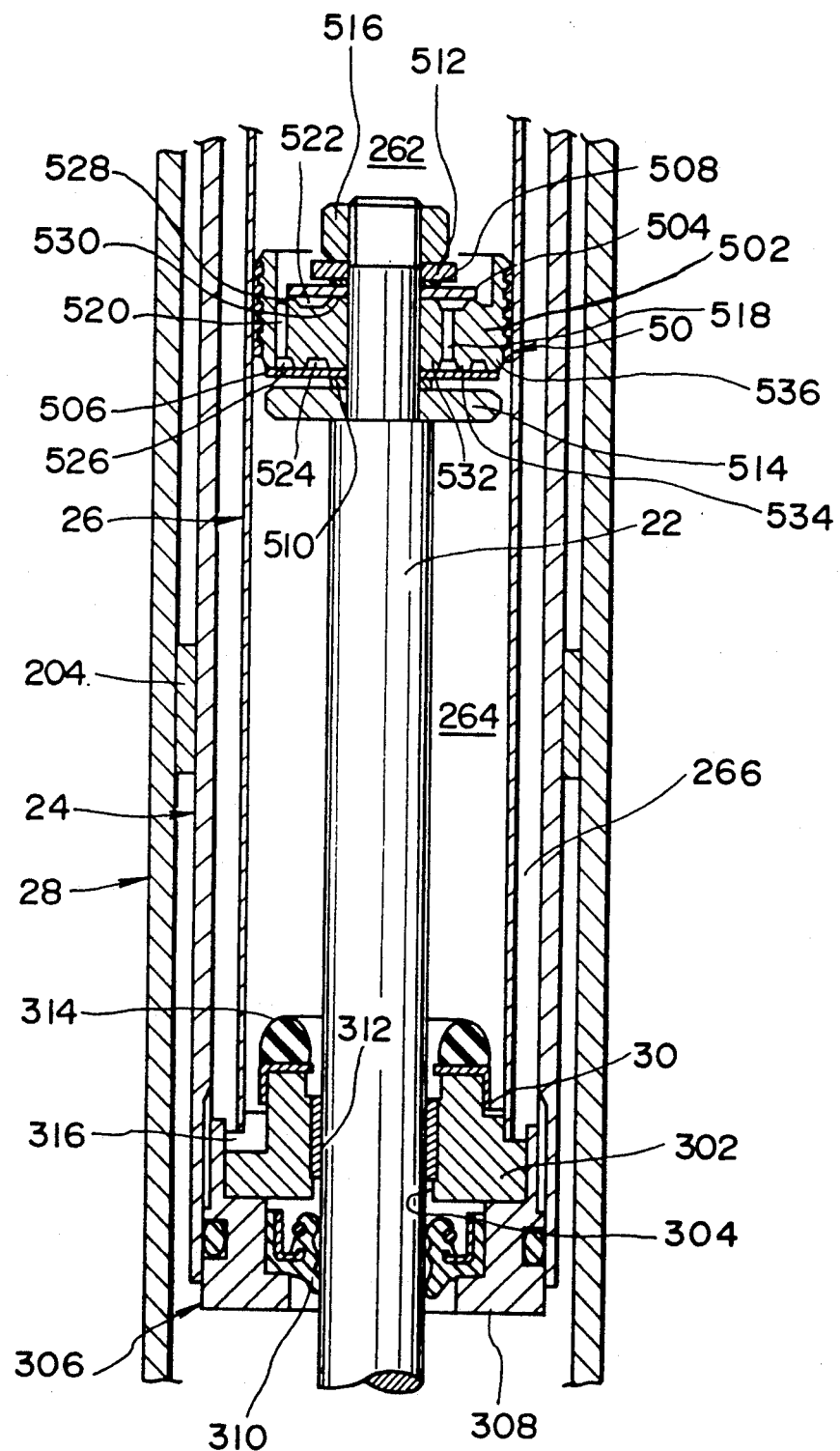
FIG. 2 is an enlarged section of the major part of the first embodiment of the shock absorber of FIG. 1, in which is shown a piston and a bottom valve employed in the first embodiment of the shock absorber.

As shown in FIG. 2, the bottom fitting guide assembly 30 generally comprises an essentially disc shaped seal ring 302 defining a center opening 304 therethrough, which center opening receives the piston rod 22. A seal assembly 306 having an essentially ring shaped retainer 308 and an elastic seal ring 310 are fitted into the lower end of the seal ring 302. The seal ring 310 sealingly contacts the outer periphery of the piston rod 22 for establishing a liquid tight seal. For completing the liquid tight seal at the seal ring 310, a pressure reduction seal 312 is provided on the inner periphery of the center opening 304. The bottom fitting guide assembly 30 is also provided with a rubber stopper 314 for protecting the sealing 302 from colliding with the piston assembly 50 during a piston rebounding stroke.

The seal ring 302 of the bottom fitting guide assembly 30 is formed with a fluid path groove 316. The fluid path groove 316 opens to the lower fluid chamber 264 at one end and to the annular lower fluid reservoir chamber 266 at the other end. Therefore, the lower fluid chamber 264 and the lower fluid reservoir chamber 266 are in fluid communication via the fluid path groove 316. The path area of the fluid path groove 316 is set small enough to restrict fluid flow therethrough and thus to serve as a fixed orifice.

On the other hand, the piston assembly 50 includes a piston body 502, upper and lower disc valves 504 and 506, washers 508 and 510, and stopper rings 512 and 514. The components listed hereabove are assembled on the upper end of the piston rod 22 and fastened thereon by means of a fastening nut 516.

The piston body 502 defines axially extending fluid path openings 518 and 520 which are oriented at radially offset positions to each other. The fluid path opening 518 oriented at radially inner position will be hereafter referred to as the "inner fluid path opening" and the other will be hereafter referred to as the "outer fluid path opening". The inner fluid path opening 518 opens to inner annular grooves 522 and 524 respectively defined on the upper and lower surfaces of the piston body 502. On the other hand, the lower end of the outer fluid path opening 520 opens to an outer annular groove 526 defined on the lower surface of the piston body. On the other hand, the upper end of the outer fluid path opening 520 directly opens to the upper fluid chamber 262.

The upper disc valve 504 is designed to be resiliently seated an outer and inner lands 528 and 530. The upper disc valve 504 is designed for resilient deformation depending upon the pressure difference between the upper fluid chamber 262 and the inner annular groove 522 for forming a variable path area orifice for permitting fluid flow from the lower fluid chamber 264 to the upper fluid chamber 262. On the other hand, the lower disc valve 506 is designed to be resiliently seated an lands 532, 534 and 536 for resilient deformation depending upon the pressure difference between the outer annular groove 526 and the lower fluid chamber 264 for forming a variable path area orifice between the valve seat surface of the land 536 and the mating surface of the lower disc valve 506. The lower disc valve 506 is formed of a through opening (not clearly shown) for permitting the working fluid in the lower fluid chamber 264 to flow into the inner annular groove 524 during piston rebounding stroke for establishing fluid flow from the lower fluid chamber 264 to the upper fluid chamber 262.

As can be appreciated from the discussion hereabove, the inner fluid path opening 518 serves for establishing fluid path for fluid flow from the lower fluid chamber 264 to the upper fluid chamber 262. Therefore, the upper disc valve 504 thus serves for generating damping force against the piston rebounding motion. Similarly, the outer fluid path opening 520 serves for establishing fluid communication from the upper fluid chamber 262 to the lower fluid chamber 264 in a piston bounding stroke. Therefore, the lower disc valve 506 serves for generating a damping force for piston bounding stroke. Both of the variable path area orifices defined by the upper and lower disc valves and the associated lands exhibit piston stroke dependency in varying the fluid flow restriction magnitude and thus varying damping characteristics. In general, the variation of damping force is proportional to the square of the piston stroke.

Figure 3:
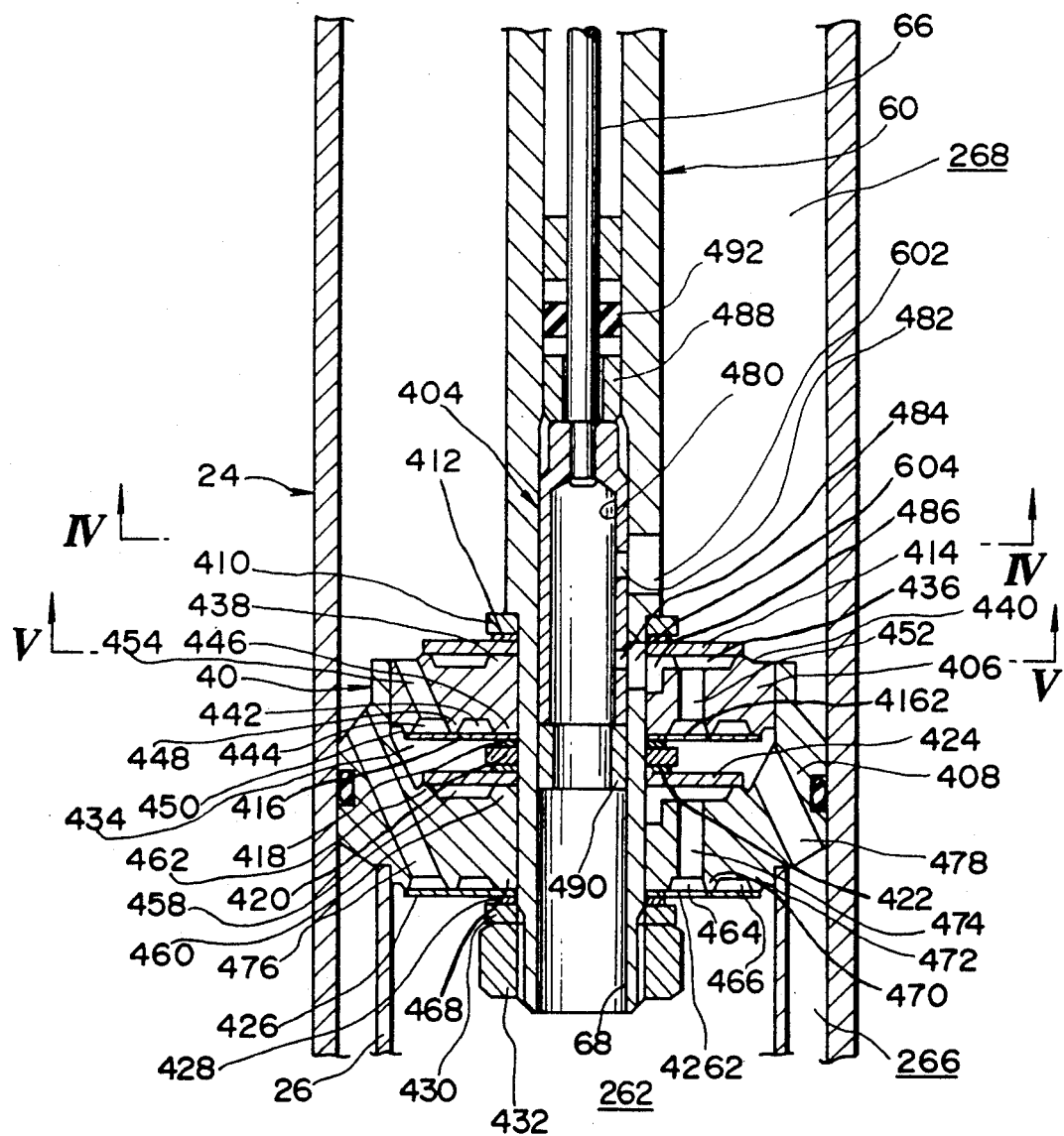
FIG. 3 is an enlarged section of the major part of the first embodiment of the shock absorber, in which is shown a top valve employed on the first embodiment of the shock absorber of FIG. 2.

As shown in FIG. 3, the top valve assembly 40 generally comprises upper and lower valve bodies 406 and 408, a retainer 410, a washer 412, a first damping valve 414, a first check valve 416, a washer 418, a retainer 420, a washer 422, a second damping valve 424, a second check valve 426, a washer 428 and a retainer 430. The components listed hereabove are assembled to the lower end portion of the cylindrical support 60 and are rigidly secured thereonto by means of a fastening nut 432. The upper and lower valve bodies 406 and 408 are assembled to each other for defining therein an internal, intermediate communication chamber 434.

The upper valve body 406 is formed with an annular groove 436 defined between lands 438 and 440 on the upper surface thereof, and inner and outer annular grooves 442 and 444 defined between lands 446, 448 and 450 on the lower surface of the upper valve body 406. An inner axially extending opening 452 extends between the annular grooves 436 and 442 for fluid communication therewith. A first skewed opening 454 has an upper end directly opening to the upper fluid reservoir chamber 268 and the lower end opening to the outer annular groove 444. Similarly, the lower valve body 408 is formed with an annular groove 458 defined between lands 460 and 462 on the upper surface thereof, and inner and outer annular grooves 464 and 466 defined between lands 468, 470 and 472 on the lower surface of the lower valve body 408. An inner axially extending opening 474 extends between the annular grooves 458 and 464 for fluid communication therewith. A second skewed opening 476 has an upper end directly opening to the upper fluid reservoir chamber 268 and the lower end opening to the outer annular groove 466. A third skewed opening 478 is formed through the lower valve body 408, which has an upper end directly opening to the internal intermediate communication chamber 434 and the lower fluid reservoir chamber 266.

The first damping valves 414 is for mating with the upper surface of the upper valve body 406 and seated on the planer upper surfaces of the lands 438 and 440 for forming a variable orifice therewith. The first check valve 416 is provided in opposition with the lower surface of the upper valve body for resiliently seating on the lower planer surfaces of the lands 446, 448 and 450. The first check valve 416 is formed with a through opening 4162 for establishing fluid communication between the inner annular groove 442 and the internal chamber 434. The first check valve 416 has a spring coefficient much smaller than that of the first damping valve 414 so that the first check valve may merely serve for establishing one-way fluid flow from the upper fluid reservoir 268 to the internal chamber 434 of the top valve assembly 40. The second damping valves 424 is provided for mating with the upper surface of the lower valve body 408 and is seated on the planer upper surfaces of the lands 460 and 462 for forming variable orifice therewith. The second check valve 426 is provided in opposition with the lower surface of the lower valve body 408 for resiliently seating on the lower planer surfaces of the lands 469, 470 and 472. The second check valve 426 is formed with a through opening 4262 for establishing fluid communication between the inner annular groove 464 and the upper fluid chamber 262. The second check valve 426 has a spring coefficient much smaller than that of the second damping valve 424 so that the second check valve may merely serve for establishing one-way fluid flow from the upper fluid reservoir 268 to the upper fluid chamber 262.

On the other hand, the cylindrical support 60 defines an axially extending opening 68. The rotary valve 404 is rotatably disposed within the lower end portion of the axially extending opening 68. The rotary valve 404 is formed in an essentially cylindrical configuration with a closed top, at which the rotary valve is rigidly connected to the lower end of the actuation rod 66. An internal space 480 of the rotary valve 404 communicates with the upper fluid chamber 262 via the lower end portion of the axially extending opening 68. The rotary valve 404 is formed with two pairs of radially extending openings 482 and 484 which are oriented to axially offset positions to each other. The upper pair of the radially extending openings 482 are oriented at higher elevation than the upper end of the top valve assembly 40. At the axial position corresponding to that of the upper pair of radially extending openings 482, a radial path opening 602 is formed through the peripheral wall of the cylindrical support 60. The outer end of the radial path opening 602 opens into the liquidous fluid chamber 2682 of the upper fluid reservoir chamber 268. Similarly, the lower pair of the radially extending openings 484 are oriented at lower elevation than the upper end of the top valve assembly 40. At the axial position corresponding to that of the lower pair of radially extending openings 484, a radial path opening 604 is formed through the peripheral wall of the cylindrical support 60. The radial path opening 604 is in fluid communication with an axially extending groove 486 which is, in turn, in fluid communication with the annular groove 436 of the upper valve body 406. Therefore, the outer end of the radial path opening 604 is in fluid communication with the annular groove 436.

Thrust bushings 488 and 490 are provided at both axial ends of the rotary valve 404 for facilitating smooth rotation of thereof. Above the upper thrust bushing 488, a seal ring 492 is provided for establishing a liquid tight seal.

Figure 4:
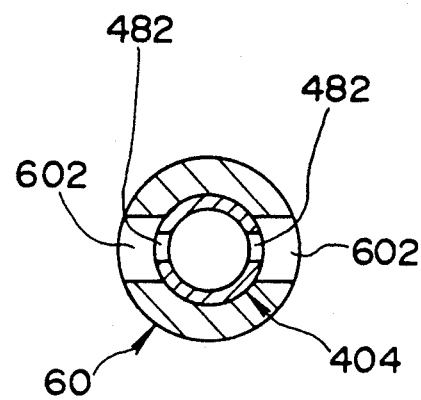
FIG. 4 is a further enlarged section taken along line IV—IV of FIG. 3.
Figure 5:
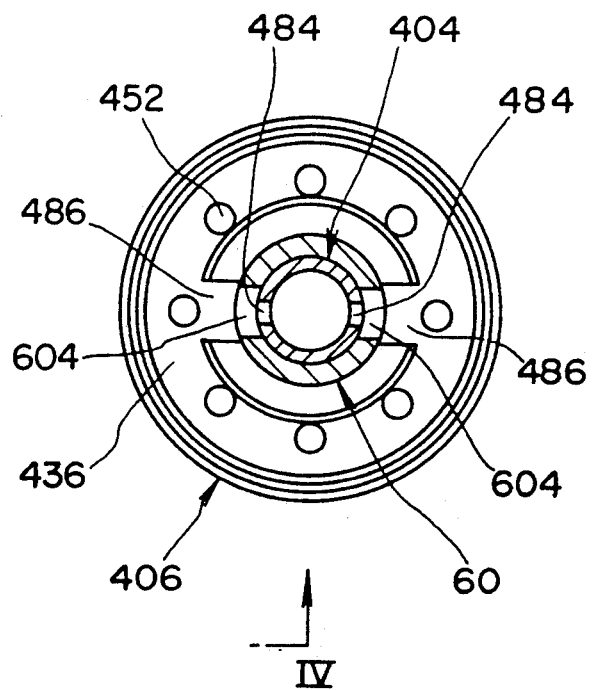
FIG. 5 is also further enlarged section taken along line V—V of FIG. 3.

As shown in FIGS. 4 and 5, the pairs of the radially extending openings 482 and 484 are provided symmetrically with respect to the center axis. Therefore, according to the angular position of the rotary valve 404, the radially extending openings 482 and 484 are selectively aligned and off-aligned with the radial path openings 602 and 604 for establishing and blocking fluid communication therethrough. Typically, the rotary valve 404 is driven for 90° so as to place the axes of the radially extending openings 482 and 484 in alignment with the axes of the radial path openings 602 and 604 at a SOFT mode position for permitting fluid flow therethrough and in perpendicular to the axes of the radial path openings at a HARD mode position for blocking fluid communication therethrough.

Figure 6:
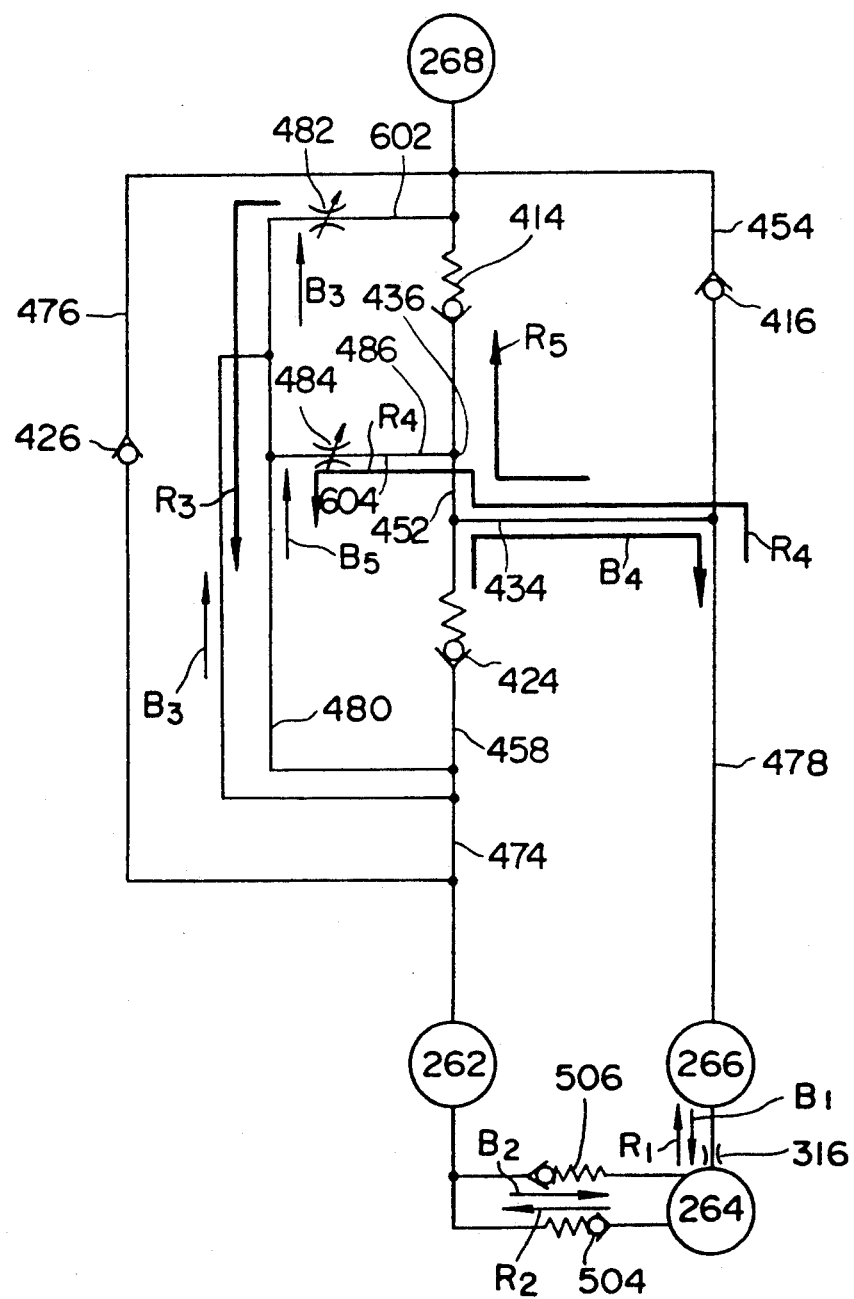
FIG. 6 is a diagrammatical illustration showing fluid path formed in the preferred embodiment of the shock absorber.

The operation of the aforementioned shock absorber in each of the bounding modes and rebounding modes of vibration will be discussed hereinbelow in order to facilitate better understanding of the shown embodiment. In order to simplify the discussion, reference is made to FIG. 6, in which is an explanatorily illustrated a schematic diagram showing fluid flow paths to be established in the shown shock absorber.

BOUNDING STROKE

In the bounding stroke, the piston assembly 50 shifts upwardly relative to the cylinder tube 26 or the outer tube 24 with the cylinder tube 26 shifts downwardly relative to the piston assembly 50. During this bounding mode motion, the volume of the upper fluid chamber 262 is compressed and the volume of the lower fluid chamber 264 is expanded. Therefore, pressure balance between the lower fluid chamber 264 and the lower fluid reservoir chamber 266 is destroyed to generate fluid flow from the lower fluid reservoir chamber to the lower fluid chamber as shown by arrow B1. The fluid flow rate from the lower fluid reservoir chamber 266 to the lower fluid chamber 264 is restricted by the limited fluid path area in the fluid path groove 316. At the same time, the fluid pressure balance between the upper and lower fluid chambers 262 and 264 is also destroyed to cause fluid flow from the upper fluid chamber to the lower fluid chamber across the piston assembly 50. The higher pressure working fluid in the upper fluid chamber 262 flows into the outer annular groove 526 via the outer fluid path opening 520. The fluid pressure in the annular groove 526 causes deformation of the lower disc valve 506 for forming the variable path area orifice to permit the fluid flow therethrough, as shown by arrow B2 of FIG. 6. At the same time, the increased fluid pressure in the upper fluid chamber 262 flows into the internal space 480 of the rotary valve 404 via the axial opening 68 of the cylindrical support 60. If the rotary valve 404 is placed at the angular position as illustrated, the limited flow rate of fluid flow is permitted to flow into the upper fluid reservoir 268 via the radially extending opening 482 and the radial path opening 602, as shown by arrow B3 in FIG. 6. Furthermore, the fluid pressure entering into the annular groove 458 via the communication opening 4262, the inner annular groove 464 and the axially extending opening 474, acts on the second damping valve 424 for causing deformation to form the variable path area orifice for fluid flow therethrough. Then, the pressurized fluid flowing into the internal chamber 434 through the variable path area orifice formed by deformation of the second damping valve 424 flows into the lower fluid reservoir chamber 266 via the third skewed opening 478, as shown by arrow B4. In addition, a part of the pressurized working fluid in the upper fluid chamber 262 flows into the internal chamber 434 via the radially extending lower opening 484, the radial path opening 604, the axial groove 486, the annular groove 436, the axially extending opening 452, and the communication opening 4162 in that order, as shown by an arrow B5.

REBOUNDING STROKE

In the rebounding motion, the piston assembly 50 shifts downwardly relative to the cylinder tube 26, or in the alternative, the outer tube 24 with the cylinder tube 26 shifts upwardly relative to the piston assembly, causing compression of volume in the lower fluid chamber 264. In this case, the higher pressure working fluid in the lower fluid chamber 264 flows into the lower fluid reservoir chamber 266 via the fluid path groove 316, as shown by arrow R1 in FIG. 6. At the same time, the higher pressure working fluid flows into the annular groove 522 via the inner annular groove 524 and the inner fluid path opening 518. The pressurized fluid in the annular groove 522 is active on the upper disc valve 504 for causing deformation thereof to form the variable path area orifice for fluid flow therethrough, as shown by arrow R2. On the other hand, the fluid pressure in the upper fluid chamber 262 decreases according to expansion of the volume thereof. As a result, the pressure balance between the upper and lower fluid chambers 268 and 266 and the upper fluid chamber 262 is destroyed. Therefore, the working fluid in the upper fluid reservoir chamber 268 flows into the upper fluid chamber 262 via the radial path opening 602, the radially extending opening 482, the internal space 480 and the axial opening 68, as shown by arrow R3. Furthermore, the working fluid in the lower fluid reservoir chamber 266 flows into the internal chamber 434 via the third skewed path 478. Then, the fluid in the intermediate chamber 434 flows into the internal space 480 via the communication opening 4162, the annular groove 442, the axial opening 452, the annular groove 436, the axial groove 486, the radial path opening 604 and the radially extending opening 484, as shown by arrow R4. Furthermore, the pressurized fluid in the intermediate chamber 434 is active on the first damping valve 414 to cause deformation for forming the fluid path as illustrated by arrow R5.

As will be appreciated herefrom, the first and second damping valves 414 and 424 serve as the principle elements for generating damping force in response to bounding and rebounding modes of vibration. Namely, the first damping valve 414 in the route R5 is active for generating damping force during the rebounding mode of vibration. On the other hand, the second damping valve 424 in the route B4 is active for the bounding stroke of vibration. Therefore, the damping characteristics of the first and second damping valves 414 and 424 are variable depending on the angular position of the rotary valve 404. Namely, when the rotary valve 404 is placed in an angular position for aligning the radially extending openings 482 and 484 with the radial path openings 602 and 604, the magnitude of damping force to be generated by the first and second damping valves 414 and 424 becomes small for providing softer damping characteristics. In contrast to this, when the rotary valve 404 is placed in an angular position for off-aligning the radially extending openings 482 and 484 with the radial path openings 602 and 604, the magnitude of damping force to be generated by the first and second damping valves 414 and 424, becomes much greater for providing harder damping characteristics.

Figure 7:
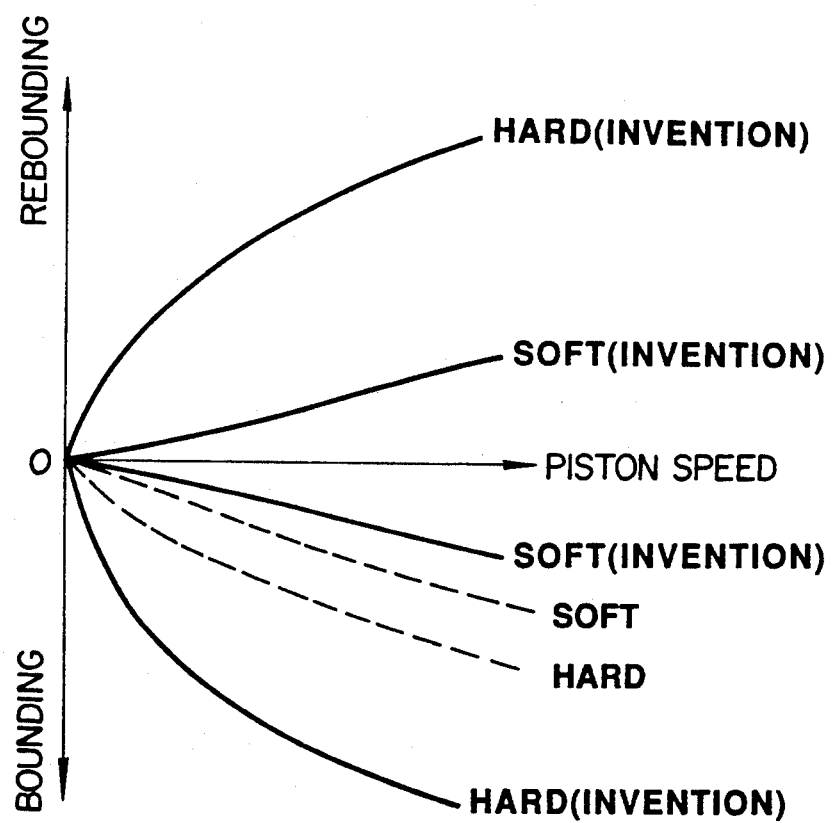
FIG. 7 is a chart showing damping characteristics of the present invention relative to the prior art.

As can be seen herefrom, in either mode of vibrations, fluid communication between the upper fluid chamber 262 and the upper and lower fluid reservoir chambers 268 and 266 is established. With the shown construction, HARD mode and SOFT mode damping characteristics are illustrated by the solid line in FIG. 7. Variation magnitude of damping force between the HARD and SOFT modes becomes much greater than that in the prior art as illustrated by the broken line in FIG. 7.

Figure 8:
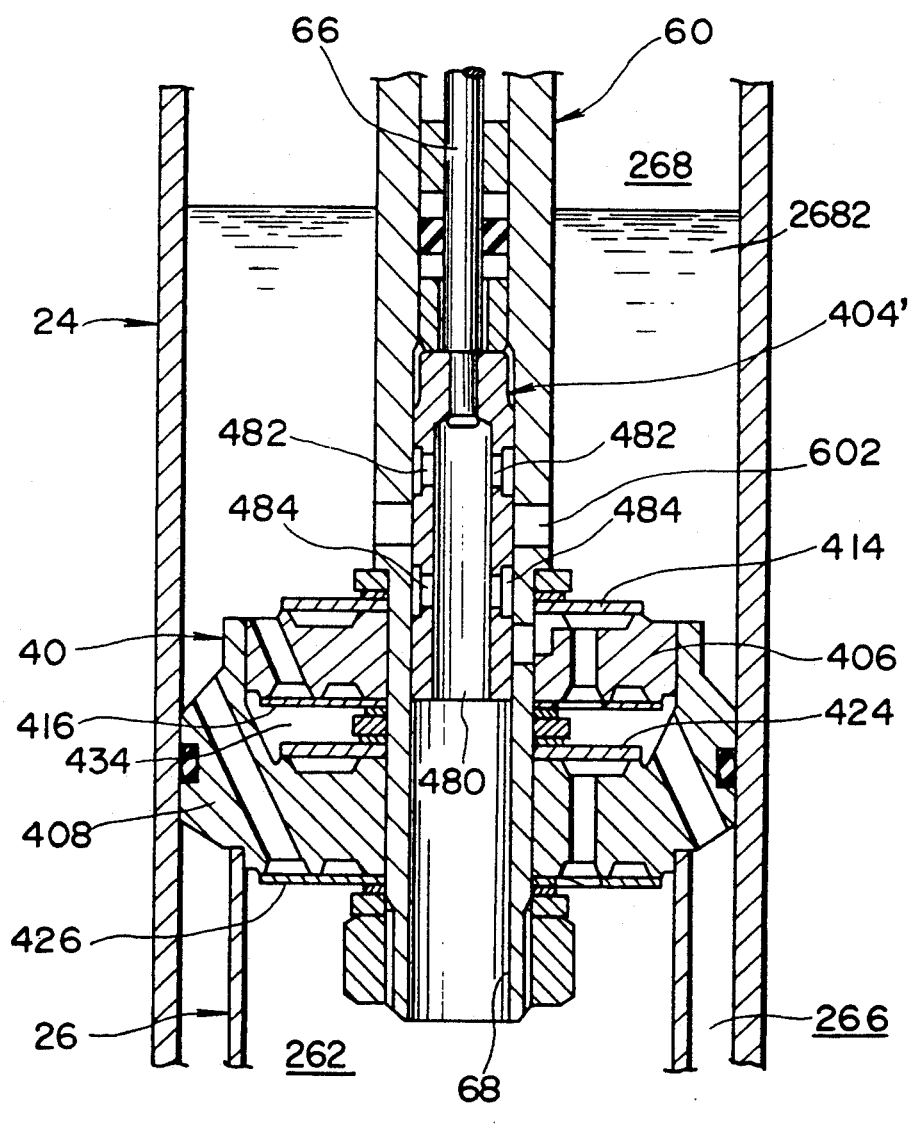
FIG. 8 is a section showing a modified construction of the top valve to be employed for establishing the fluid flow path of FIG. 7.

FIG. 8 is a modification of the foregoing embodiment of the shock absorber. In the shown modification, the rotary valve 404 in the former embodiment has been replaced with a thrusting valve 404' for axial movement along the axis of the axial opening 68 of the cylindrical support 60.

FIGS. 9, 10, 11 and 12 show another embodiment of the top valve assembly to be employed in the shown embodiment of the shock absorber according to the invention. The shown embodiment will be discussed utilizing the common reference numerals for the components essentially common to the former embodiments.

Figure 9:
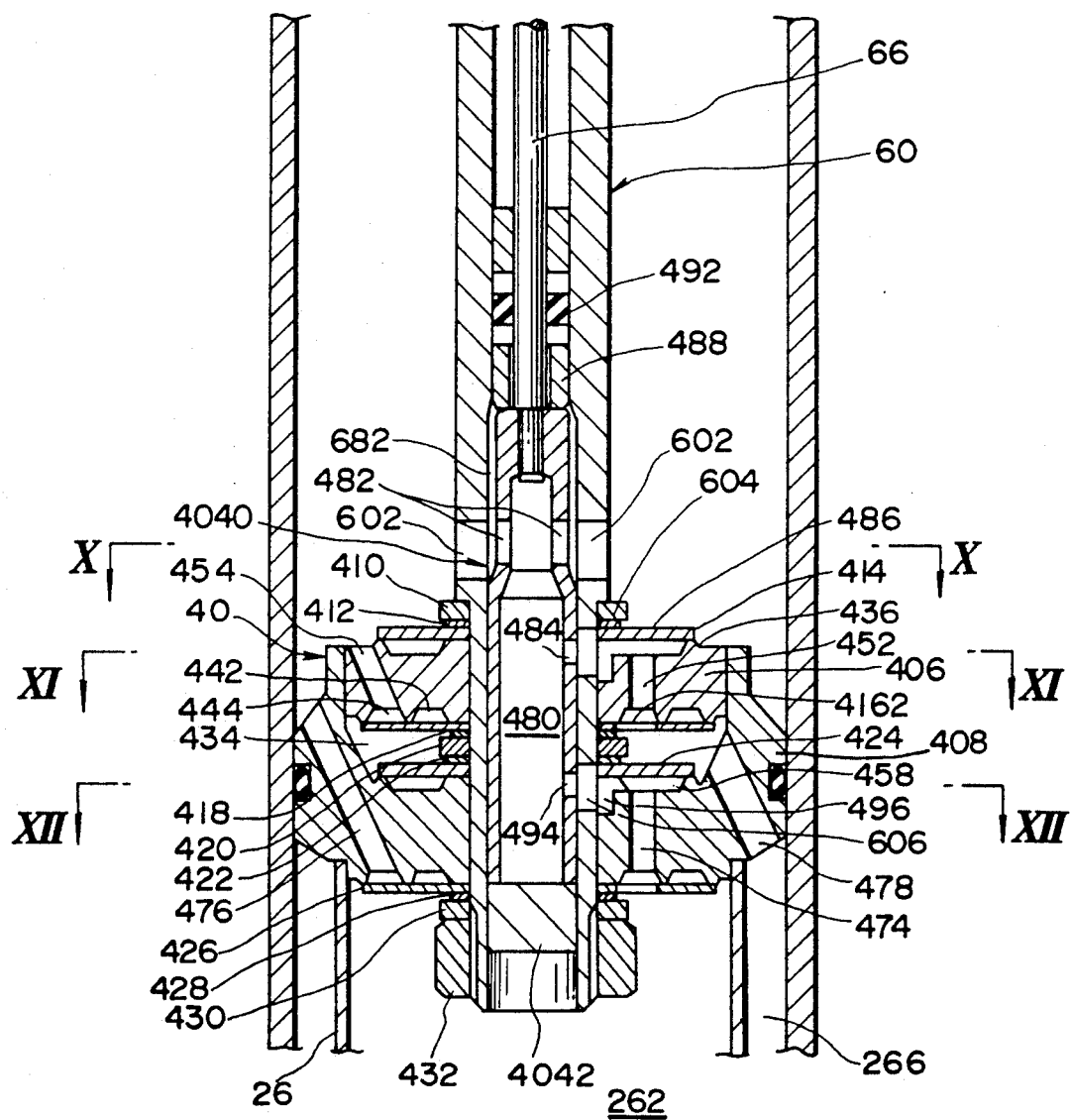
FIG. 9 is a section showing another embodiment of a top valve assembly to be employed in the preferred embodiment of the variable damping force shock absorber according to the invention.

The shown embodiment is typically differentiated from the embodiment shown in FIG. 3 in the rotary valve construction. Namely, in the shown embodiment, the lower end of the rotary valve 4040 is sealingly closed by an end fitting 4042. In FIG. 9, reference numeral 682 designates an annular fluid passage provided for fluid communication between the radially extending openings 482 and the radial path openings 602. Therefore, direct fluid communication between the internal space 480 of the rotary valve 4040 and the upper fluid chamber 262 via the axial opening 68 of the cylindrical support 60 is blocked. In place of this, another pair of radially extending openings 494 are formed through the rotary valve 404. The radially extending openings 494 are oriented at lower elevation than the radially extending opening 484. The radially extending opening 494 is designed to selectively establish and block fluid communication between the internal space 480 and radial path openings 606 formed through the cylindrical support 60. The radial path opening 606 are in fluid communication with the annular groove 458 formed on the upper surface of the lower valve body 408, via axially extending grooves 496.

Figure 10:
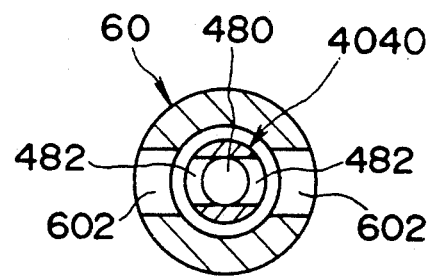
FIGS. 10 to 12 are cross sections respectively taken along X—X, XI—XI and XII—XII of FIG. 9.
Figure 11:
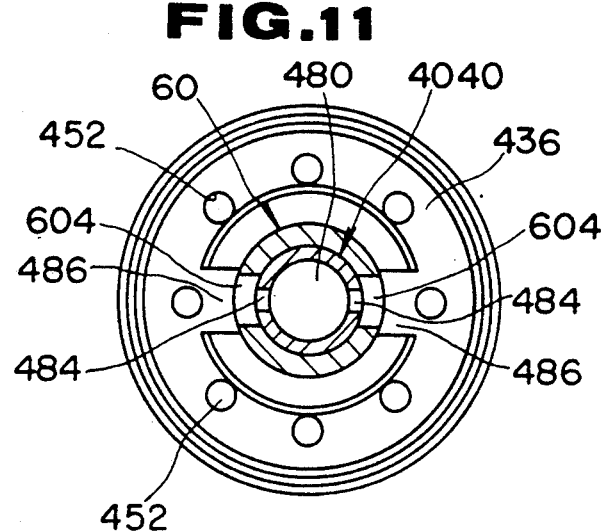
Figure 12:
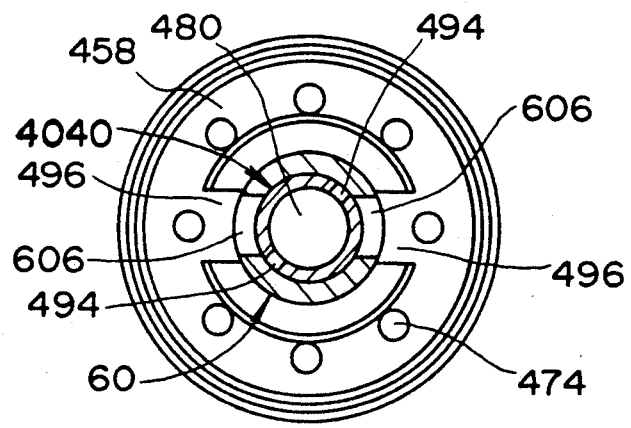

With the shown embodiment of the top valve assembly, the radially extending openings 494 and the radial path opening 606 cooperate to form another fixed orifice as aligned to each other. In the shown embodiment, the radially extending openings 494 are provided with angular offset from the angular orientation of the radially extending openings 482 and 484 as shown in FIGS. 10, 11 and 12.

Figure 13:
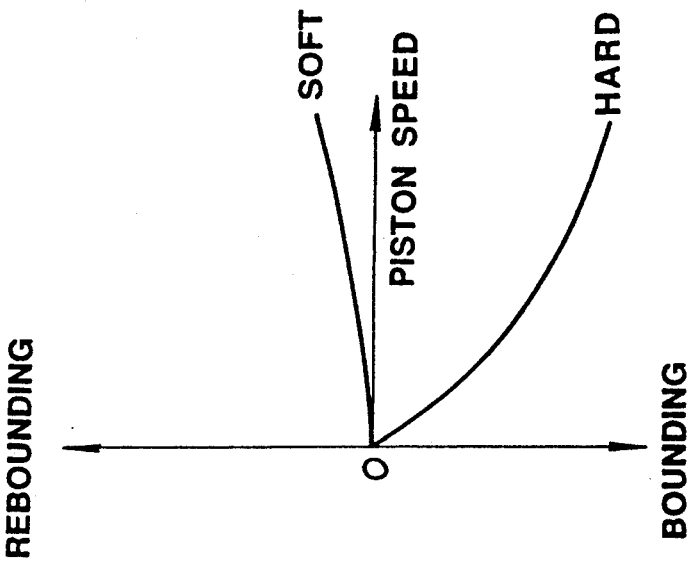
FIGS. 13 and 14 are charts showing damping characteristics relative to the bounding and rebounding motions at various modes in the shock absorber employing the top valve of FIG. 9.
Figure 14:
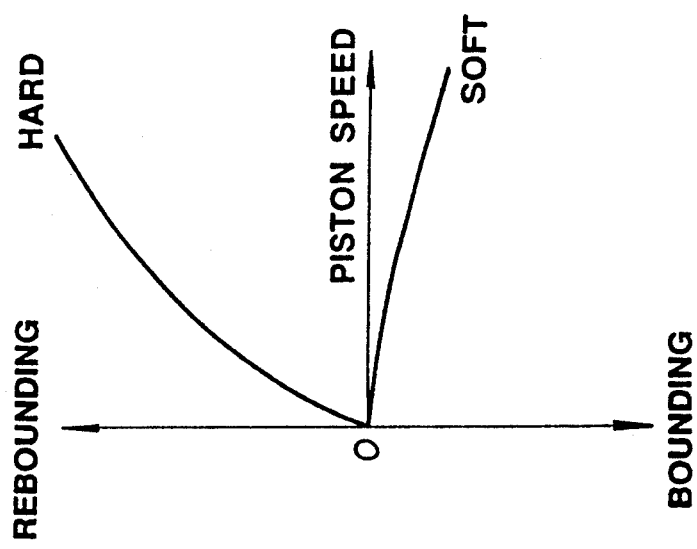

In the shown embodiment, the radially extending openings 484 and 494 are aligned in alternative fashion so that when one of the pairs of openings 484 and 494 are aligned with the corresponding radial path openings 604 and 606, the other pair are placed off-alignment from the corresponding radial path openings. In the shown embodiment, the angular offset of the radially extending openings 494 with respect to the radially extending opening 484 is set at approximately 45°. With the shown embodiment, HARD and SOFT mode selection becomes alternative as illustrated by FIGS. 13 and 14.

Figure 15:
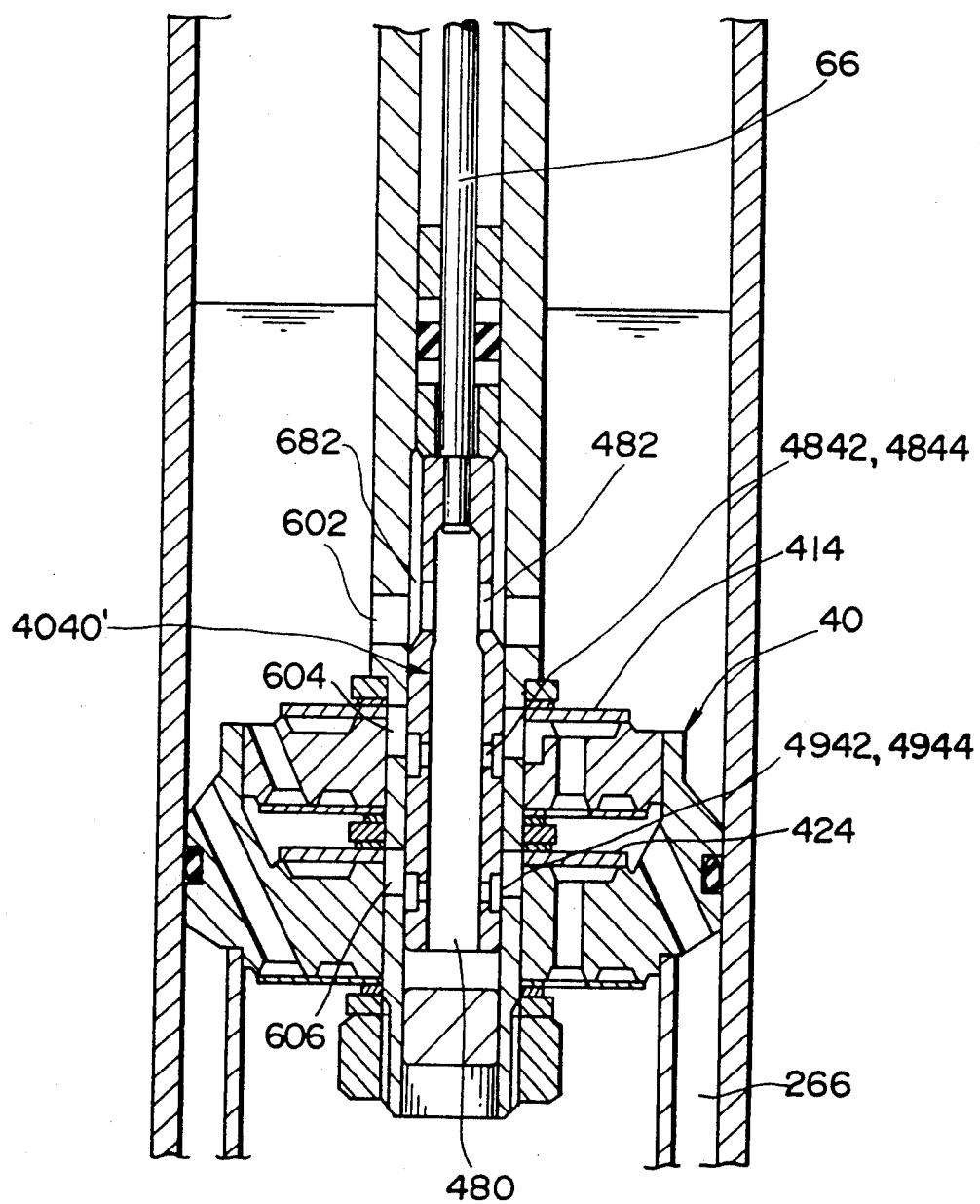
FIG. 15 is a section showing a modification of the top valve assembly of FIG. 9.

Similar adjustment of the damping modes can be done by the thrusting valve 4040', as shown in FIG. 15. In the case of the thrusting valve 4040' of FIG. 15, it becomes possible to vary flow restriction magnitude by adjusting overlapping magnitude between the radially extending openings 482, 4842, 4844, and 4942, 4944 and the radial path openings 602, 604 and 606.

Figure 16:
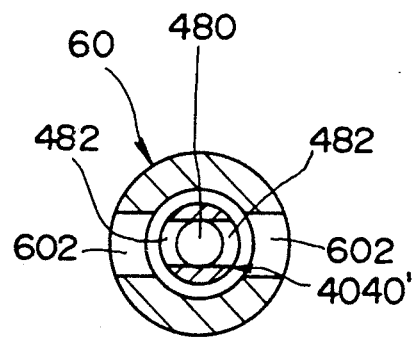
FIGS. 16 to 18 are cross sections respectively taken along X—X, XI—XI and XII—XII showing modification of the top valve assembly of FIG. 9.
Figure 17:
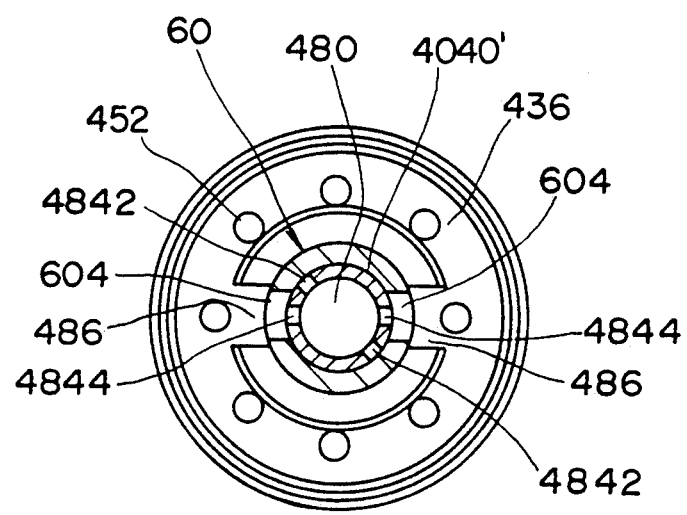
Figure 18:
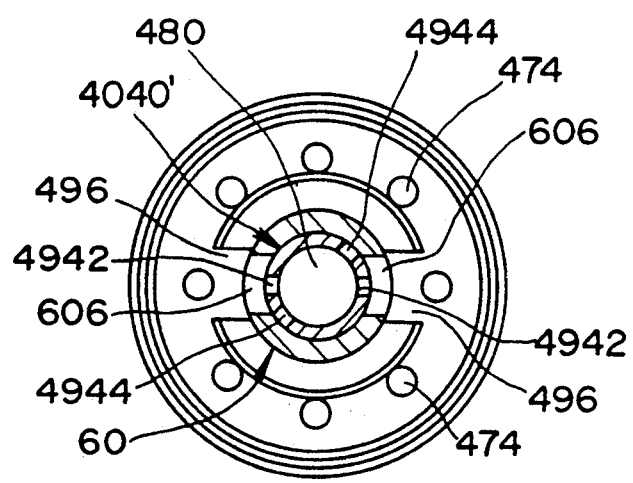
Figure 22:
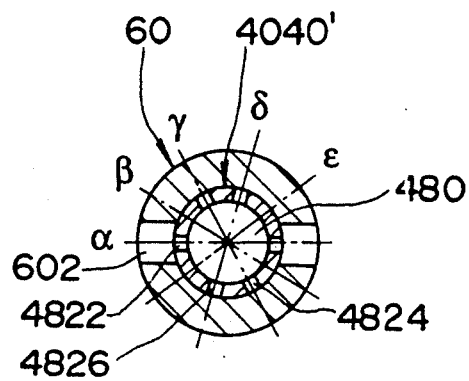
FIGS. 22 to 24 are cross sections respectively taken along X—X, XI—XI and XII—XII showing another modification of the top valve assembly of FIG. 9.
Figure 23:
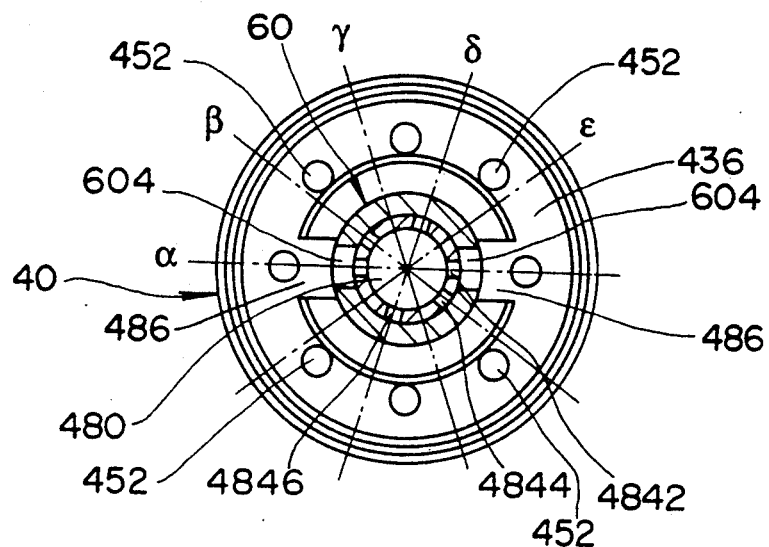
Figure 24:
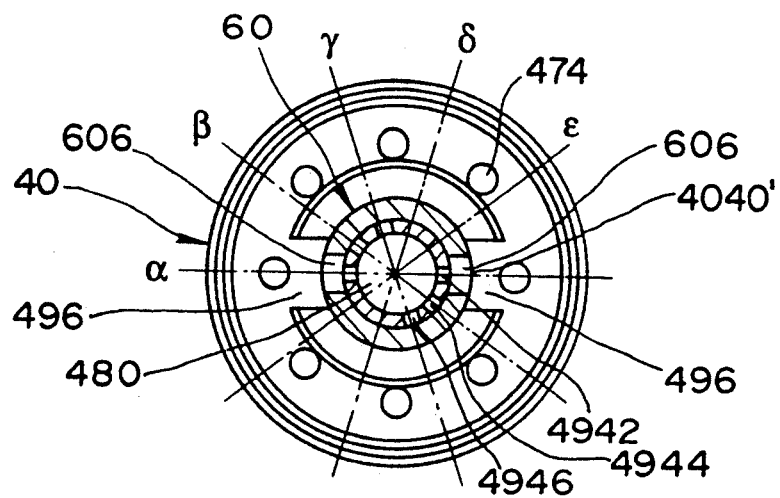
Figures 25, 26, 27, 28, 29:
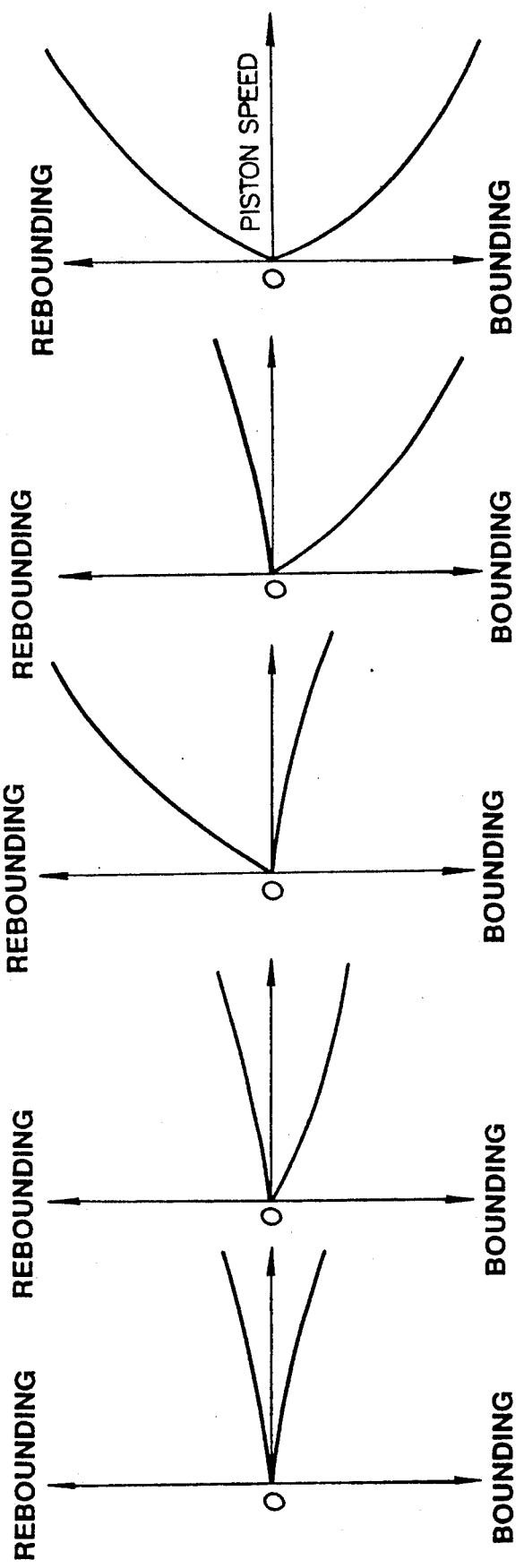
FIGS. 25 to 29 are charts showing damping characteristics relative to the bounding and rebounding motions at various modes in the shock absorber employing the top valve of FIG. 9.

Though the foregoing embodiments are directed to two way mode, i.e. HARD and SOFT modes, adjustments of the damping characteristics of the shock absorber, it may be possible to provide capability of more than two modes. Namely, in the example of FIGS. 16, 17 and 18, respective two pairs of radially extending openings 4842, 4844 and 4942 and 4944 are provided. Respective pairs of radially extending openings 4844 and 4944 are provided with angular shift from the radially extending orifices 4842 and 4942 in a magnitude of 60°. With the shown arrangement of the radially extending openings of FIGS. 16, 17 and 18, three way variable damping characteristics as shown in FIGS. 19, 20 and 21 can be obtained. On the other hand, in the example of FIGS. 22, 23 and 24, the respective three pairs of radially extending openings 4822, 4824, 4826, 4842, 4844, 4846 and 4942, 4944, 4946 are provided. In the shown construction, the pairs of radially extending openings 4822, 4824 and 4826 are respectively aligned on radial axes α, γ and δ. Similarly, the radially extending openings 4842, 4844 and 4846 are respectively aligned on radial axes α, β and δ. Also, the radially extending openings 4942, 4944 and 4946 are respectively aligned on radial axes α, β and γ. The radial axes α, β, γ, δ and ε are respectively provided an angular shift of 36°. With the shown arrangement of radially extending openings of FIGS. 22, 23 and 24, five way different damping modes can be established as shown in FIGS. 25, 26, 27, 28 and 29. Namely, in the shown position in FIGS. 22, 23 and 24, the radially extending openings 4822, 4842 and 4942 are aligned on the axis α. The damping characteristics of FIG. 25 are obtained. Similarly, at respective angular positions, aligning the radially extending openings 4822, 4842 and 4942 on respective of axes β and γ, the radial axes α, β, γ, δ and ε, and the damping characteristics respectively illustrated in FIGS. 26, 27, 28 and 29 can be obtained.

As will be appreciated herefrom, the present invention is successful in providing capability of adjustment of damping characteristics in both of the bounding and rebounding modes of vibration without causing cavitation. Therefore, the present invention fulfills all of the objects and advantages sought therefore.

While the present invention has been discussed in terms of the preferred embodiments for practically implementing the invention, the invention can be embodied in various fashions. Therefore, the invention should be appreciated to include all possible embodiments and modifications thereof which are embodied without departing from the principal of the invention as set out in the appended claims.

What is claimed is

1. A reverse installed type variable damping force shock absorber for an automotive suspension system, comprising:
an inner cylinder filled with a working fluid;
an outer cylinder coaxially housing therein said inner cylinder and connected to a vehicular body for vertical movement according to vertical motion of the vehicle body, said outer cylinder defining a space between said inner cylinder, said space forming a reservoir chamber and a communication chamber which is separated from said reservoir chamber;
a piston disposed within the interior space of said inner cylinder for defining therein first and second fluid chambers, said piston being connected to a suspension member adapted to rotatably support a vehicular wheel via a piston rod for vertical movement within said vehicular wheel;
a first fluid path means for establishing fluid communication between said first fluid chamber and said second fluid chamber via said communication chamber, said first fluid path means active in response to a bounding mode relative displacement between said vehicular body and said vehicular wheel for permitting fluid flow from said first fluid chamber to said second fluid chamber;
a second fluid path means, defined independently of said first fluid path, for establishing fluid communication between said second fluid chamber and said reservoir chamber via said communication chamber, said second fluid path means active in response to a rebounding mode relative displacement between said vehicular body and said vehicular wheel for permitting fluid flow from said second fluid chamber to said fluid reservoir chamber;
a first damping force generating means disposed in said first path for generating damping force against bounding mode relative displacement between said vehicular body and said vehicular wheel;
a second damping force generating means disposed in said second fluid path means for generating damping force against rebounding mode relative displacement between said vehicle body and said vehicular wheel, and
a pressure drop compensation path means active during said rebounding mode of relative displacement for permitting flow of working fluid from said fluid reservoir chamber to said first chamber for compensating excess drop of the fluid pressure in said first chamber.

2. A shock absorber as set forth in claim 1, which further comprises a third fluid path means for establishing fluid communication between said first fluid chamber and said reservoir chamber by-passing said first and second fluid path means, a first variable throttling means disposed in said third fluid path means and externally operable for adjusting flow restriction magnitude.

3. A reverse installed tape variable damping force shock absorber for an automotive suspension system comprising:
an inner cylinder filled with a working fluid;
an outer cylinder coaxially housing therein said inner cylinder and connected to a vehicular body for vertical movement according to vertical motion of the vehicle body, said outer cylinder defining a space between said inner cylinder, said space forming a reservoir chamber and a communication chamber which is separated from said reservoir chamber;
a piston disposed within the interior space of said inner cylinder for defining therein first and second fluid chambers, said piston being connected to a suspension member adapted to rotatably support a vehicular wheel via a piston rod for vertical movement within said vehicular wheel;

a first fluid path means for establishing fluid communication between said first fluid chamber and said second fluid chamber via said communication chamber;

a second fluid path means, defined independently of said first fluid path, for establishing fluid communication between said fluid chamber and said reservoir chamber via said communication chamber;

a first damping force generating means disposed in said first path for generating damping force against bounding mode relative displacement between said vehicular body and said vehicular wheel;

a second damping force generating means disposed in said second fluid path means for generating damping force against rebounding mode relative displacement between said vehicle body and said vehicular wheel;

a third fluid path means for establishing fluid communication between said first fluid chamber and said reservoir chamber by-passing said first and second fluid path means, a first variable throttling means disposed in said third fluid path means and externally operable for adjusting flow restriction magnitude; and fourth fluid path means for establishing fluid communication between said first and second fluid chambers, and a second variable throttling means disposed in said fourth fluid path means and externally operable for adjusting flow restriction magnitude.

4. A shock absorber as set forth in claim 3, wherein said first and second variable throttling means are operative for providing different damping characteristics for bounding and rebounding mode relative motions of said vehicular body and said vehicular wheel.

5. A shock absorber as set forth in claim 4, wherein each of said first and second variable throttling means is switchable between harder damping mode and softer damping mode so that harder damping characteristics is obtained for bounding mode relative motion when damping characteristics for rebounding mode motion is set in softer characteristics and vis-a-vis.

6. A shock absorber as set forth in claim 5, wherein said variable throttling means are so cooperated as to further establish softer damping characteristics both for bounding and rebounding mode relative motions of said vehicular body and said vehicular wheel.

7. A reverse installed type variable damping force shock absorber for an automotive suspension system comprising:

an inner cylinder filled with a working fluid;

an outer cylinder coaxially housing therein said inner cylinder and connected to a vehicular body for vertical movement according to vertical motion of the vehicle body, said outer cylinder defining a space between said inner cylinder, said space forming a reservoir chamber and a communication chamber which is separated from said reservoir chamber;

a piston disposed within the interior space of said inner cylinder for defining therein upper and lower fluid chambers, said piston being connected to a suspension member adapted to rotatably support a vehicular wheel via a piston rod for vertical movement within said vehicular wheel;

a base member mounted on the top of said inner cylinder and separating the interior space of said inner cylinder and said reservoir chamber;

a first fluid path means communicating between said upper chamber with said fluid reservoir chamber, said first fluid path means incorporating first and second damping valves arranged in series;

a second fluid path for communicating a portion of said first fluid path means positioned between said first and second damping valves to said fluid reservoir chamber;

a third fluid path for communicating said portion of said first fluid path means to said upper chamber by-passing said first damping valve;

a fourth fluid path for communicating said reservoir chamber and said upper fluid chamber via a first check valve;

a fifth fluid path for communicating said reservoir chamber and said lower chamber via a second check valve; and a variable orifice means disposed within said third fluid path.

8. A reverse installed type variable damping force shock absorber for an automotive suspension system comprising:

an inner cylinder filled with a working fluid;

an outer cylinder coaxially housing therein said inner cylinder and connected to a vehicular body for vertical movement according to vertical motion of the vehicle body, said outer cylinder defining a space between said inner cylinder, said space forming a reservoir chamber and a communication chamber which is separated from said reservoir chamber;

a piston disposed within the interior space of said inner cylinder for defining therein upper and lower fluid chambers, said piston being connected to a suspension member adapted to rotatably support a vehicular wheel via a piston rod for vertical movement within said vehicular wheel;

a base member mounted on the top of said cylinder and separating the interior space of said inner cylinder and said reservoir chamber;

a first fluid path communicating said upper chamber with said fluid reservoir chamber, said first fluid path means incorporating a first and second damping valves arranged in series:

a second fluid path for communicating a portion of said first fluid path positioned between said first and second damping valves to said fluid reservoir chamber;

a third fluid path for communicating said portion of said first fluid path to said upper chamber by-passing said first damping valve;

a fourth fluid path providing in parallel to said first and second damping valves for communicating said upper fluid chamber and said fluid reservoir chamber;

a fifth fluid path for communicating said reservoir chamber and said upper fluid chamber via a first check valve;

a sixth fluid path for communicating said reservoir chamber and said lower chamber via a second check valve; and a first variable orifice means including a first orifice disposed within said third fluid path; and a second variable orifice means including a second orifice disposed within said fourth fluid path.

9. A reverse installed type variable damping force shock absorber for an automotive suspension system comprising:

an inner cylinder filled with a working fluid;
an outer cylinder coaxially housing therein said inner cylinder and connected to a vehicular body for vertical movement according to vertical motion of the vehicle body, said outer cylinder defining a space between said inner cylinder, said space forming a reservoir chamber and a communication chamber which is separated from said reservoir chamber;
a piston disposed within the interior space of said inner cylinder for defining therein upper and lower fluid chambers, said piston being connected to a suspension member adapted to rotatably support a vehicular wheel via a piston rod for vertical movement within said vehicular wheel via a piston rod for vertical movement within said vehicular wheel;
a base member mounted on the top of said cylinder and separating the interior space of said inner cylinder and said reservoir chamber;
a first fluid path communicating said upper chamber with said fluid reservoir chamber, said first fluid path means incorporating a first and second damping valves arranged in series;
a second fluid path for communicating a portion of said first fluid path positioned between said first and second damping valves to said fluid reservoir chamber;
a third fluid path for communicating said portion of said first fluid path to said upper chamber by-passing said first damping valve;
a fourth fluid path provided in parallel to said first and second damping valves for communicating said upper fluid chamber and said fluid reservoir chamber;
a fifth fluid path for communicating said reservoir chamber and said upper fluid chamber via a first check valve;
a sixth fluid path for communicating said reservoir chamber and said lower chamber via a second check valve; and
a first variable orifice means including a first orifice disposed within said third fluid path; and
a second variable orifice means disposed within said fourth fluid path, and including a second orifice located adjacent said fluid reservoir chamber and a third orifice located adjacent said upper fluid chamber.

10. A reverse installed type variable damping force shock absorber for an automotive suspension system comprising:

an inner cylinder filled with a working fluid;
an outer cylinder coaxially housing therein said inner cylinder and connected to a vehicular body for vertical movement according to vertical motion of the vehicle body, said outer cylinder defining a space between said inner cylinder, said space forming a reservoir chamber and a communicating chamber which is separated from said reservoir chamber;
a piston disposed within the interior space of said inner cylinder for defining therein upper and lower fluid chambers, said piston being connected to a suspension member adapted to rotatably support a vehicular wheel via a piston rod for vertical movement within said vehicular wheel;
a base member mounted on the top of said cylinder and separating the interior space of said inner cylinder and said reservoir chamber;
a first fluid path communicating said upper chamber with said fluid reservoir chamber, said first fluid path means incorporating a first and second damping valves arranged in series;
a second fluid path for communicating a portion of said first fluid path positioned between said first and second damping valves to said fluid reservoir chamber;
a third fluid path for communicating said portion of said first fluid path to said upper chamber by-passing said first damping valve;
a fourth fluid path provided in parallel to said first and second damping valves for communicating said upper fluid chamber and said fluid reservoir chamber;
a fifth fluid path for communicating said reservoir chamber and said upper fluid chamber via a first check valve;
a sixth fluid path for communicating said reservoir chamber and said lower chamber via a second check valve;
a first variable orifice means including a first orifice disposed within said third fluid path; and
a second variable orifice means including a second orifice disposed within said fourth fluid path,
wherein said first and second variable orifice means being operable between a soft mode in which both of said first and second orifices are open, a rebounding hard mode in which said first orifice is open and said second orifice restricts fluid flow, and a bounding hard mode in which said first orifice restricts fluid flow and said second orifice is open.

11. A reverse installed type variable damping force shock absorber for an automotive suspension system comprising:

an inner cylinder filled with a working fluid;
an outer cylinder coaxially housing therein said inner cylinder and connected to a vehicular body for vertical movement according to the vertical motion of the vehicle body, said outer cylinder defining a space between said inner cylinder, said space forming an annular chamber and a communication chamber which is separated from said annular chamber, said outer cylinder further defining a reservoir chamber, said outer cylinder permitting relative movement of said inner cylinder relative thereto in response to bounding and rebounding mode vibration transmitted between said vehicular body and a vehicular wheel;
a piston disposed within the interior space of said inner cylinder for defining therein upper and lower fluid chambers, said piston being connected to a suspension member adapted to rotatably support said vehicular wheel via a piston rod for vertical movement within said vehicular wheel;
a first fluid path means for fluid flow from said first fluid chamber to said second fluid chamber in response to bounding mode vibration, said first fluid path means incorporating a first damping force generating valve means for restricting fluid flow from said first fluid chamber to said second fluid chamber in order to generate damping force resisting against said bounding mode vibration;

a second fluid path means for fluid flow from said second chamber to said fluid reservoir chamber across said annular chamber and said communicating chamber in response to rebounding mode vibration, said second fluid path means incorporating a second damping force generating valve means for restricting fluid flow thereacross for generating damping force resisting against the rebounding mode vibration; and a third fluid path means for fluid flow from said fluid reservoir to said first fluid chamber in response to the rebounding mode vibration for compensating for an excessive drop of fluid pressure in said first fluid chamber, said third fluid path means incorporating a third valve means active independently of said second damping force generating valve and permitting one-way flow from said fluid reservoir chamber to said first fluid chamber.

12. A reverse installed type variable damping force shock absorber for an automotive suspension system comprising:

an inner cylinder filled with a working fluid;

an outer cylinder coaxially housing therein said inner cylinder and connected to a vehicular body for vertical movement according to the vertical motion of the vehicle body, said outer cylinder defining a space between said inner cylinder, said space forming an annular chamber and a communication chamber which is separated from said annular chamber, said outer cylinder further defining a reservoir chamber, said outer cylinder permitting relative movement of said inner cylinder relative thereto in response to bounding and rebounding mode vibration transmitted between said vehicular body and a vehicular wheel;

a piston disposed within the interior space of said inner cylinder for defining therein upper and lower fluid chambers, said piston being connected to a suspension member adapted to rotatably support said vehicular wheel via a piston rod for vertical movement within said vehicular wheel;

a first fluid path means for fluid flow from said first fluid chamber to said second fluid chamber in response to bounding mode vibration, said first fluid path means incorporating a first damping force generating valve means for restricting fluid flow from said first fluid chamber to said second fluid chamber in order to generate damping force resisting against said bounding mode vibration;

a second fluid path means for fluid flow from said second chamber to said fluid reservoir chamber across said annular chamber and said communicating chamber in response to rebounding mode vibration, said second fluid path means incorporating a second damping force generating valve means for restricting fluid flow thereacross for generating damping force resisting against the rebounding mode vibration; and a third fluid path means for fluid flow from said fluid reservoir to said first fluid chamber in response to the rebounding mode vibration for compensating for an excessive drop of fluid pressure in said first fluid chamber, said third fluid path means incorporating a third valve means active independently of said second damping force generating valve and permitting one-way flow from said fluid reservoir chamber to said first fluid chamber; and a fourth fluid path means for fluid flow from said annular chamber to said second fluid chamber in response to the bounding mode vibration for compensating for an excessive pressure drop in said second fluid chamber, said fourth fluid path means incorporating a fourth valve means independent of said first damping force generating valve for permitting one-way flow of the working fluid from said annular chamber to said second fluid chamber.

* * * * *